United States Patent [19]

Gonze et al.

[11] Patent Number: 4,909,225
[45] Date of Patent: Mar. 20, 1990

[54] MULTI-FUEL ENGINE CONTROL WITH FUEL TRANSITION DELAY

[75] Inventors: Eugene V. Gonze; David B. Brown, both of Sterling Heights, Mich.

[73] Assignee: General Motors Corporation, Detroit, Mich.

[21] Appl. No.: 367,277

[22] Filed: Jun. 16, 1989

[51] Int. Cl.$^4$ .............................................. F02M 51/00
[52] U.S. Cl. ................................. 123/494; 123/1 A; 123/575
[58] Field of Search ................ 123/494, 478, 1 A, 575

[56] References Cited

U.S. PATENT DOCUMENTS

| | | | |
|---|---|---|---|
| 4,323,046 | 4/1982 | Barber | 123/575 |
| 4,369,736 | 1/1983 | Ito | 123/1 A |
| 4,438,749 | 3/1984 | Schwippert | 123/494 |
| 4,470,300 | 9/1984 | Kobayashi | 73/304 C |
| 4,594,968 | 6/1986 | Degobert et al. | 123/1 A |
| 4,625,698 | 12/1986 | Jamrog | 123/489 |
| 4,706,630 | 11/1987 | Wineland et al. | 123/478 |

FOREIGN PATENT DOCUMENTS 57-76231  5/1982  Japan .

OTHER PUBLICATIONS

"An On-Board Sensor for Percent Alcohol" IEEE 0018-9545/0800-0142, 1978 (Aug.).
"Vehicle Operation with Variable Methanol/Gasoline Mixtures" Proceedings VI International Symposium on Alcohol Fuels Technology, May '84.

Primary Examiner—E. Rollins Cross
Attorney, Agent, or Firm—Robert M. Sigler

[57] ABSTRACT

A fuel control for an engine using a liquid mixture of two fuels, such as gasoline and methanol, having different volumetric heat contents is responsive to a fuel compostion sensor to update a stored engine fuel control parameter. When a significant change in fuel composition is sensed, the stored engine fuel control parameter is not updated for a fuel transition time duration to allow the unchanged fuel still in the conduit between the sensor and engine to be used with the unchanged stored engine fuel control parameter.

2 Claims, 6 Drawing Sheets

MULTI-FUEL ENGINE CONTROL WITH FUEL TRANSITION DELAY

BACKGROUND OF THE INVENTION

This invention relates to a multi-fuel engine control and particularly to such a control of the type in which fuel is pumped from a tank to the engine through a conduit which includes a fuel composition sensor, the output of which is used in updating a stored engine fuel control parameter. If the tank contains a mixture of gasoline and methanol, for example, in proportions which might vary with time, a fuel composition sensor which generates a signal indicative of the relative proportions of gasoline and methanol may be sampled to update the stored engine fuel control parameter, which is used by an engine operating computer in controlling the fuel supply system in order to provide the correct amount of fuel with varying fuel composition.

However, the fuel composition sensor may be placed in the conduit at a point between the fuel tank and the engine in which a predetermined time is required for the fuel pump to pump the fuel from the sensor to the engine. This may be true even if the sensor is located in the engine compartment itself. If fuel composition is changing slowly and gradually, the time delay between the sensing of a fuel change and the arrival of the changed fuel at the engine may be ignored. However, if a sudden significant change in fuel composition is sensed and the stored engine fuel control parameter is immediately updated in response to this change with unchanged fuel still in the conduit between the sensor and the engine, the engine will operate with the wrong fuel amount for the predetermined time.

SUMMARY OF THE INVENTION

Therefore, this invention provides a fuel control of the type described above in which, when a significant change in fuel composition is sensed, the stored engine fuel control parameter is not updated for a fuel transition time duration to allow the unchanged fuel still in the conduit between the sensor and engine to be used with the unchanged stored engine controlling parameter.

The invention is a fuel control for a vehicle engine having a fuel tank with a liquid fuel mixture comprising first and second combustible fuels, a fuel conduit to the engine, a fuel pump activated during engine operation to pump the fuel mixture from the fuel tank to the engine, a fuel composition sensor in the fuel conduit responsive to a physical parameter of the fuel mixture to generate a fuel composition signal indicative of the relative proportions of the first and second fuels in the fuel mixture, and means normally responsive to the fuel composition sensor during engine operation to repeatedly update a stored engine fuel control parameter in response to the fuel composition signal. The means normally responsive to the fuel composition signal is effective, in response to a predetermined change in the fuel composition signal, to delay updating of the stored engine fuel control parameter in response to the predetermined change for a fuel transition time duration substantially equal to the time required for the fuel pump to pump fuel from the fuel composition sensor to the engine If the fuel pump pressure is variable during engine operation, the fuel transition time may be varied inversely with a fuel pressure indicating parameter to compensate for the variation in fuel flow rate with fuel pressure. Further details and advantages of this invention will be apparent from the accompanying drawings and following description of a preferred embodiment.

DESCRIPTION OF THE PREFERRED EMBODIMENT

Figure 1:
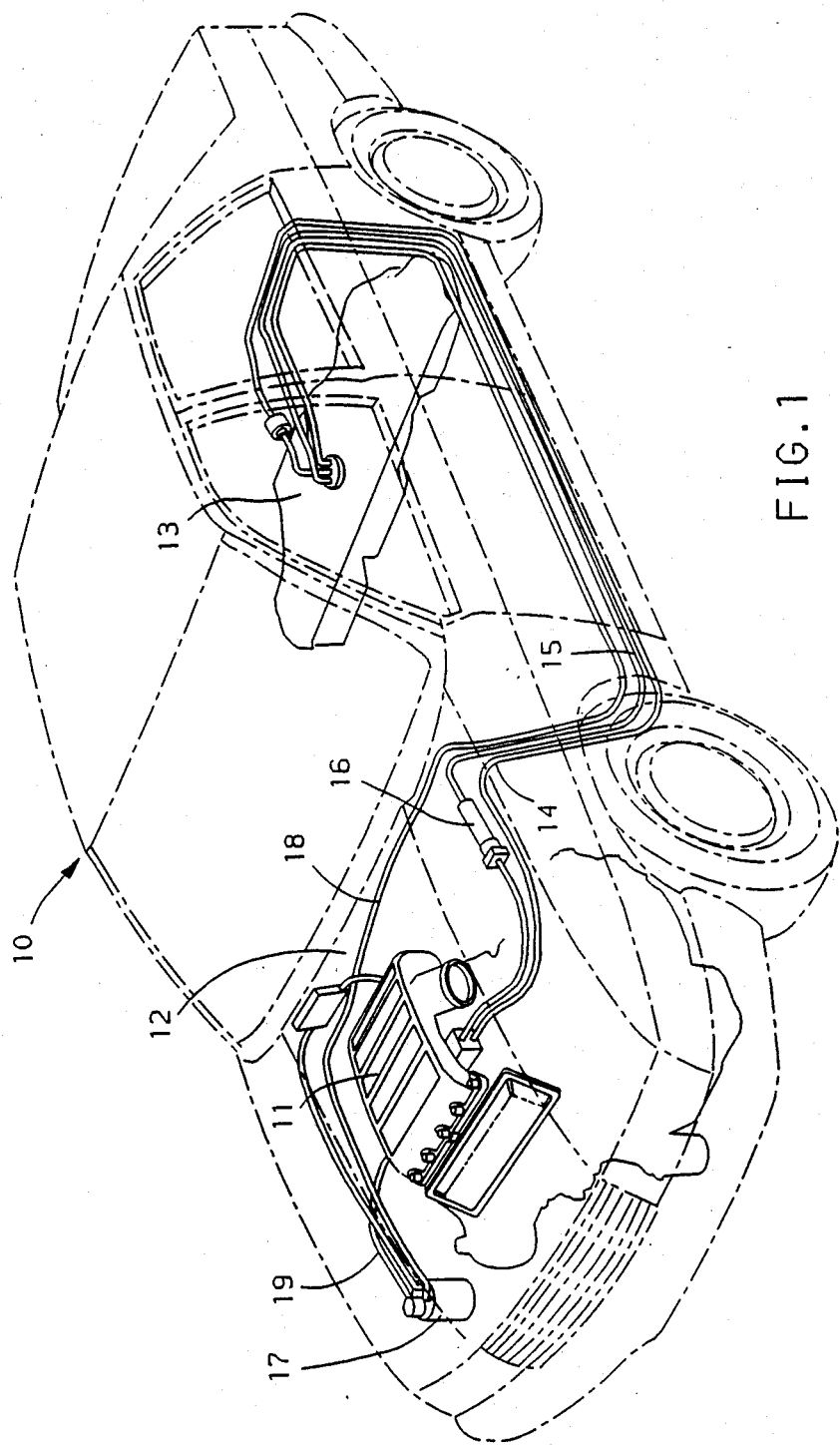
FIG. 1 shows a vehicle having an engine with a multi-fuel control according to the invention.

Referring to FIG. 1, a motor vehicle 10 is provided with an internal combustion engine 11 in an engine compartment 12, engine 11 receiving fuel from a fuel tank 13 at the opposite end of the vehicle through a fuel conduit 15 and returning excess fuel to tank 13 through fuel conduit 14. Fuel conduit 15 includes a fuel composition sensor 16 located within engine compartment 12 at a point close to engine 11. Fuel composition sensor 16 generates a signal indicative of the relative proportion of alcohol to gasoline in the fuel flowing therethrough. Several such sensors are known, although the preferred sensor is a capacitive dielectric sensor which measures the dielectric constant of the fuel. Such a sensor is universal in the sense that it provides a correct output for any mixture of any type of alcohol, such as ethanol, methanol, etc. as well as several motor fuel additives. A sensor which may be used is a capacitive, dielectric constant fuel composition sensor described in U.S. Ser. No. 268,431, filed on Nov. 7, 1988 by Eugene V. Gonze and assigned to the assignee of this application. A standard fuel vapor collection canister 17 is connected by a vapor conduit 18 to fuel tank 13 for collection of vapor therefrom and another vapor conduit 19 to the induction system of engine 11.

The operation of engine 11 is controlled by an electronic controller 20, which may be located at the rear of the engine compartment as shown or any other convenient location. Controller 20 may be a programmed digital computer similar to those presently used in motor vehicles for engine control. The apparatus is well known, comprising a microprocessor, RAM, ROM and appropriate input/output circuitry, with an appropriate program stored in ROM to coordinate receipt of input information from various sensors, perform calculations and table look-ups and output commands to various actuators of engine related components.

Figure 2:
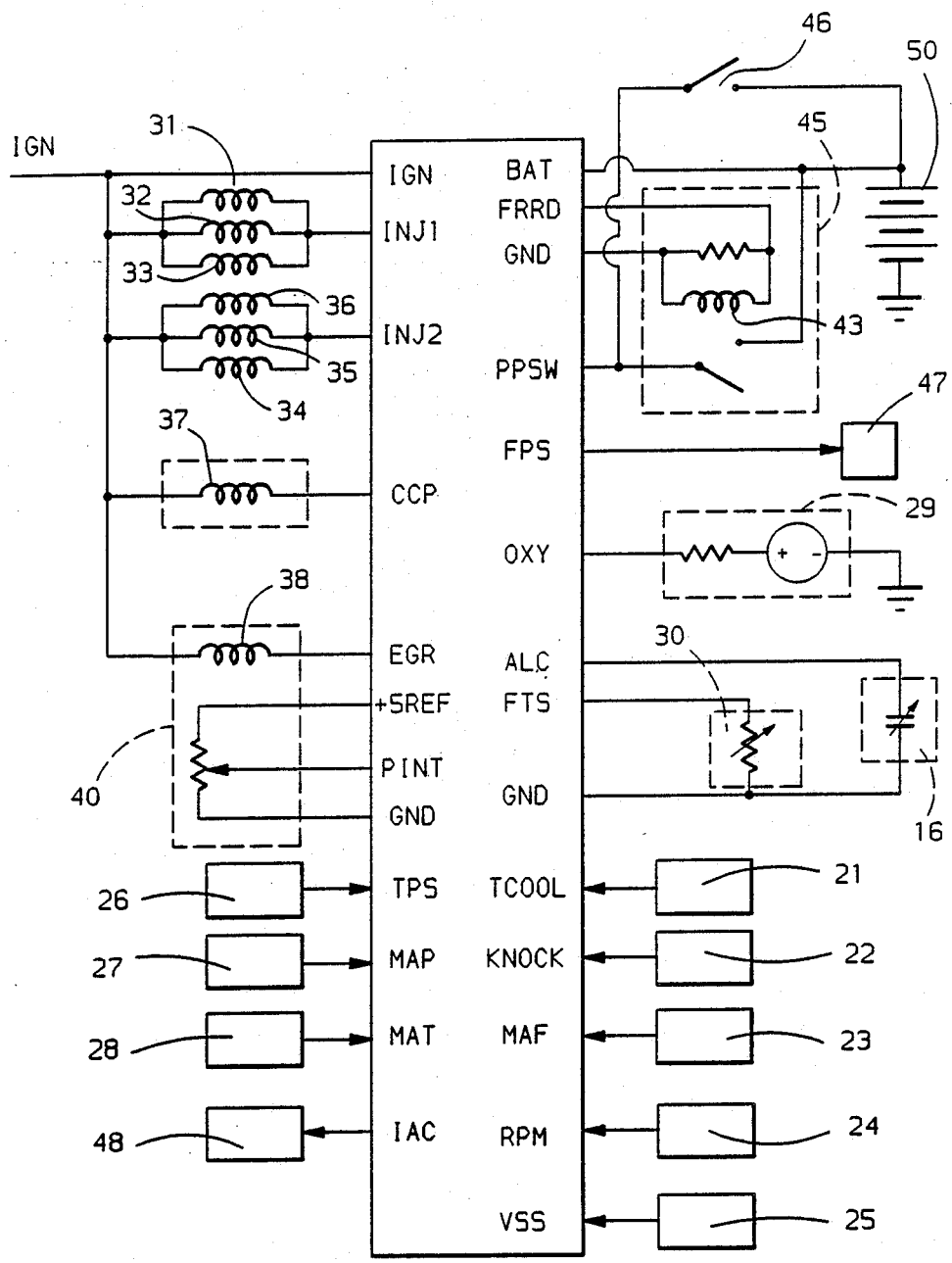
FIG. 2 shows a schematic diagram of a controller for use in the vehicle of FIG. 1.

Controller 20 is shown in FIG. 2 with many of its input/output connections to various engine related components. Controller 20 receives vehicle battery voltage from a battery 50 at input BAT and is grounded at input GND. Controller 20 will, of course, include standard power supply circuitry, not shown, to derive its own regulated operating voltage from the typical 9–16 volts of battery 50, which actually represents the full vehicle power supply, including also a standard engine driven alternator and voltage regulator. Controller 20 receives an IGN input from the vehicle ignition switch which has one value when the ignition switch is closed and another when the ignition switch is open. It may receive a coolant temperature input TCOOL from a coolant temperature sensor 21, a KNOCK input from a knock sensor 22, a mass airflow input MAF from a mass airflow sensor 23, an engine speed signal RPM from an engine speed sensor 24, a vehicle speed signal VSS from a vehicle speed sensor 25, a throttle position input TPS from a throttle position sensor 26, a manifold absolute pressure input MAP from a MAP sensor 27, a manifold air temperature signal MAT from a manifold air temperature sensor 28, an oxygen sensor input OXY from an exhaust composition sensor 29, a fuel composition input ALC from fuel composition sensor 16 and a fuel temperature input FTS from a fuel temperature sensor 30 included in the package of fuel composition sensor 16.

Still referring to FIG. 2, Controller 20 has output INJ1 for simultaneous control of engine fuel injectors 31-33 and output INJ2 for simultaneous control of engine fuel injectors 34-36. It further has a canister purge control output duty cycle signal CCP for a CCP solenoid 37 in canister 17. Controller 20 further has an EGR control output EGR to the EGR solenoid 38 of an EGR valve 40 and an input pintle position feedback signal PINT derived from a valve position responsive potentiometer 41 within EGR valve 40. Potentiometer 41 is biased with a constant 5 volt reference relative to ground. Controller 20 further outputs a fuel pump relay drive signal FPRD to the activating coil 43 of a fuel pump relay for a fuel pump 45 in tank 13 and receives a fuel pump input signal PPSW from the engine oil pressure switch 46, through which armature 47 of the fuel pump relay is connected to battery 50 when the relay is not activated.

The fuel for engine 11 is pumped from fuel tank 13 by fuel pump 45 through conduit 15 to standard fuel injection apparatus for engine 11 including the injectors 31-36. The fuel pump may include pressure regulating apparatus to maintain a constant fuel pressure to engine 11, with excess fuel returned to tank 13. Alternatively, some embodiments, especially that described with respect to FIG. 8, may have a Variable fuel pump pressure control, in which an output signal FPS controls a variable voltage power supply 47 to drive the fuel pump at a controlled speed and thus provide a controlled variable fuel pressure.

When controller 20 outputs an injector fire signal on output INJ1 or INJ2, the appropriate injectors are opened to inject fuel under the regulated pressure of pump 45 into the fuel induction passages of engine 11 adjacent the engine cylinder intake valves. The injectors close to end the fuel delivery when the injector fire signal ends. The fuel is therefore injected in pulses having a nominally constant flow for a controlled time duration; and the fuel delivered is thus assumed to be a function of pulse duration. In the particular engine shown, all injectors are normally pulsed simultaneously once each crankshaft rotation, with each injector delivering half its total calculated fuel (half the total calculated pulse duration) for the cycle with each activation. Engine 11 is shown as a six cylinder engine with one injector for each cylinder. Since two crankshaft rotations are required for a full cycle of six cylinder firings, each injector will normally deliver the full calculated amount of fuel for each cycle of two crankshaft rotations.

The air to the cylinders of engine 11 is admitted through a standard air cleaning element into the same standard induction apparatus with airflow controlled by a throttle valve and sensed by MAF sensor 23, with its temperature sensed by MAT sensor 28. Throttle position sensor 26 senses the position of the throttle valve just described; and MAP sensor 28 senses the pressure within the induction apparatus downstream from the throttle valve. The output signal IAC may be used to control an idle air flow apparatus 48, either by varying the position of a throttle stop or varying a valve in an idle air bypass passage, as are well known in the art. Engine 11 is further provided with a spark ignition system of normal construction and operation as concerns this description, which is therefore not shown.

In general, fuel delivery to engine 11 is affected by the presence of alcohol in the fuel in two ways. The first is the different volumetric heat content and therefore stoichiometric air/fuel ratio of various fuels such as methanol and gasoline. Engine 10 is designed to normally operate at a stoichiometric air/fuel ratio of 14.6 for optimum combustion of gasoline consistent with a three way catalytic converter and a closed loop fuel control with an oxygen sensor in the exhaust; however, the stoichiometric air/fuel ratio of methanol is 6.5. Therefore, the injector pulse duration calculation should normally be modified for the varying stoichiometric air/fuel ratio of the fuel delivered to the engine, as indicated by a fuel composition factor ALC %, which is derived from sensor output ALC as described at a later point in this specification. This is to compensate for the varying volumetric heat content of the two fuels and is, in general, well known in the prior art.

The second way in which alcohol affects fuel delivery to the engine is the change in viscosity with changing ratios of methanol, for example, to gasoline and the variation of the viscosity of the fuel mixture with fuel temperature. A constant fuel viscosity is generally assumed in the normal fuel pulse duration calculation. However, since viscosity affects the fuel flow rate through the injector, it varies the total fuel delivered for a given pulse duration. The actual calculated fuel pulse duration should thus also be adjusted by a viscosity factor which is a function of fuel composition ALC % and may also be a function of fuel temperature FTS. This factor is multiplied by the total injector pulse duration except for the portion which represents the correction amount for injector opening.

For example, the normal cranking fuel pulse duration NCRANKPW for pure gasoline would be of the following form:

$$NCRANKPW = BCPW + INJCORR,$$

wherein a calculated base crank pulse duration BCPW is corrected with an injector correction duration INJCORR. The base crank pulse width may be computed according to any known prior art algorithm but generally at least includes a factor which depends on coolant temperature TCOOL. It is calibrated based on the known injector flow characteristics and the viscosity of gasoline at a predetermined fuel temperature in order to provide the desired amount of fuel at a predetermined fuel fuel pressure as determined by the regulated fuel pump pressure. INJCORR is added to account for injector opening time. This term is not fuel related, since it represents the equivalent time taken by the fuel injector apparatus to open before fuel flow begins and therefore is a function of injector mechanical and electrical characteristics. It may be varied as a function of electric supply voltage to the injectors; but it is not corrected for varying fuel composition.

The modification of the normal cranking pulse duration equation to a similar equation for a multi-fuel crank pulse duration MCRANKPW thus involves two steps. The first step is the modification of the base crank pulse duration to a multi-fuel base crank pulse duration MBCPW, which is also a function of fuel composition. A convenient manner of effecting this change is to expand the 2D lookup table of the coolant temperature factor to a 3D lookup table on coolant temperature TCOOL and fuel composition ALC %. The second step is to provide a viscosity factor VISC for the modified base pulse duration:

MCRANKPW=(MBCPW)(VISC)+INJCORR.

The viscosity multiplier VISC is itself derived from a 3D lookup table as a function of fuel composition ALC % and fuel temperature FTS; it corrects for the variation in viscosity with varying gasoline/alcohol fuel composition and the variation in viscosity of an alcohol containing mixture with temperature so that the calculated fuel pulse duration delivers the correct volume of fuel. Since the variation in fuel pulse duration due to viscosity changes with fuel composition will not necessarily vary in the same manner as the variation in fuel pulse duration due to changes in stoichiometric A/F ratio with fuel composition, and since the fuel temperature lookup is performed only with the former, the two corrections are not combined in a single lookup table. No fuel composition correction is applied to the injector correction duration INJCORR, since the latter is not affected by fuel characteristics.

After the engine starts, the fuel algorithm gradually blends from the cranking fuel equation above to the normal fuel equation, which outputs a normal fuel injected pulse duration BPINJ as follows:

BPINJ=[(BPW)((BLM)(DE)+AE)](VISC)+CORRCL+INJCORR

In the preceding equation,
BPW is a calculated base pulse duration,
BLM is a block learn multiplier,
DE is a deceleration enleanment multiplier,
AE is an acceleration enrichment term,
CORRCL is a closed loop correction term,
INJCORR is the injector correction term, and
VISC is the fuel viscosity multiplier.

It can be seen that the normal fuel equation is corrected for varying fuel viscosity in essentially the same way as that for cranking fuel: that is, the major portion of the pulse duration controlling the amount of fuel is multiplied by the viscosity correction factor VISC, which is derived from a lookup table from fuel composition ALC % and fuel temperature FTS, while the injector correction term is not affected. If desired, the closed loop correction term may also be viscosity compensated as follows:

BPINJ=(BPW)((BLM)(DE)+AE)+CORRCL]·(VISC)+INJCORR

In this case, the total portion of the pulse duration controlling the amount of fuel is multiplied by the viscosity correction factor. However, it is generally not necessary to do this, since the closed loop correction factor is an incremental amount added to approach the exact required air/fuel ratio and not an open loop calculated fuel amount and so is far less affected by the proportion of alcohol.

The base pulse width term BPW may be derived from the mass air flow rate, engine speed, desired fuel/air ratio and injector flow rate. The mass air flow rate in grams of air per second and inverse engine speed in computer clock pulses per cylinder are combined and scaled by a constant to a load variable LV8. Base pulse width is then given by the following equation:

BPW=$K_1$(LV8)(INJ)(F/A), wherein $K_1$ is a scaling constant, LV8 is the load factor defined above, INJ is the injector flow rate and F/A is the desired fuel/air ratio, which is the scaled inverse of the air/fuel ratio. In the calculation of BPW, LV8 is calculated from engine operating parameters as it has been in the prior art, regardless of fuel composition. The desired fuel/air ratio F/A is calculated by a straight line interpolation between the desired ratios for gasoline and methanol (or whatever other fuel is used) on the basis of the sensed alcohol percent ALC %. The injector flow rate is a constant term calibrated for a particular engine and depending on the fuel viscosity of gasoline and injector characteristics. Those skilled in the art of engine control will be aware that there are other basic engine fuel control algorithms, such as those based on engine speed and an engine load factor such as manifold absolute pressure or vacuum. The particular method of determining the base pulse width is not important to the invention described herein.

The block learn multiplier BLM is an adaptive control term stored in memory as a function of engine operating condition which is used to transfer a major portion of the closed loop control into open loop control by an adaptive learning process and thus reduce the closed loop correction required. The operation of such adaptive controls is well known in the prior art and is not modified by fuel composition except as hereinafter described.

The deceleration enleanment multiplier DE is used to decrease fuel during deceleration, based on throttle position and/or another suitable parameters. It can have a non-zero value to reduce fuel or may be made zero to stop fuel. The non-zero value is adjusted by a factor based on fuel composition ALC % and coolant temperature from a lookup table. For the engine described, the value of DE decreases with temperature for pure gasoline and increases with temperature for pure methanol. Fuel compositions in between these extremes produce a blending of the curves. If the DE term goes to zero, no fuel is delivered. However, at the end of the fuel cutoff period, asynchronous priming pulses may be delivered; and these are adjusted on the basis of ALC % The acceleration enrichment term AE is used to provide additional fuel, on the basis of a positive change in load parameter LV8, during acceleration. AE is modified on the basis of fuel composition, and possibly coolant temperature, from a lookup table. It should also be mentioned that the fuel may be subject to a coolant temperature responsive choke function wherein extra fuel is delivered while the engine is warming up. Such a function may use a multiplier which decreases with increasing coolant temperature until it attains an essentially unity value, at which it remains. Both the value of this multiplier and the decay rate may be functions of ALC % as well as of coolant temperature.

The closed loop correction term CORRCL is added when closed loop control is enabled. It comprises integral and proportional terms. CORRCL is derived from the rich/lean status of the fuel mixture as determined from an oxygen sensor in the exhaust system of the engine. A standard zirconia oxygen sensor generates a voltage which varies in response to excess free oxygen sensed in the exhaust gas, which is determined by the rich/lean status of the fuel relative to stoichiometry. The sensor output is a voltage which varies quite sharply through a narrow region about stoichiometry. This voltage, or a number derived thererfrom for use in a computer, may be compared with a reference having a predetermined relationship with stoichiometry as part of a process to generate a signal indicative of the rich/lean status of the actual engine air/fuel ratio.

One would expect, since the sensor is sensitive to factors related to stoichiometry itself rather than absolute fuel/ratio, that the sensor output would not be significantly affected by varying fuel composition. However, the operation of such oxygen sensors has indeed been found to be affected by the presence of methanol in the fuel, which tends to shift the output voltage of the sensor to read on the rich side and thus, in closed loop control, drive the engine fuel system lean. The shift is small—on the order of 0.1–0.2 A/F ratios; however, a shift of this size on the lean side of stoichiometry has a significant effect on $NO_x$ conversion by a reducing catalyst. Therefore, the system is corrected by shifting the reference voltage or voltages with which the oxygen sensor output is compared in the same direction and in similar amount as the shift in sensor output voltage so the sensor will read leaner and correct for the change introduced by the methanol.

An example of a closed loop correction system based on an oxygen sensor is shown in U.S. Pat. No. 4,625,698 to Jamrog, issued Dec. 2, 1986. In this system the actual sensor output voltage is processed to form a fast filtered (ff) value and a slow filtered (sf) value; and these filtered values are compared with ff and sf voltage windows, respectively. Each of the ff and sf filtered values is determined to be rich or lean if it is outside the respective window on the rich or lean side, respectively, or, if it is within the respective window, whether it is changing in the rich or lean direction, respectively. In order to adjust for multi-fuel operation in the Jamrog system, the ff and sf windows are both shifted in direction to bias the algorithm to read lean and in amount to just compensate for the effect of alcohol in the fuel and thus maintain a consistent relationship between the references and stoichiometry. The shift is non-linear on fuel composition ALC % and engine load and is thus derived from a lookup table. Any normal shift of the windows with engine load is also increased, so that the lookup table is 3D on fuel composition ALC % and an engine load factor. The result affects not only the determination of whether the fuel is sensed rich or lean but also the size of the error terms which are used to calculate the proportional correction factor as described in the aforementioned patent.

Figure 3:
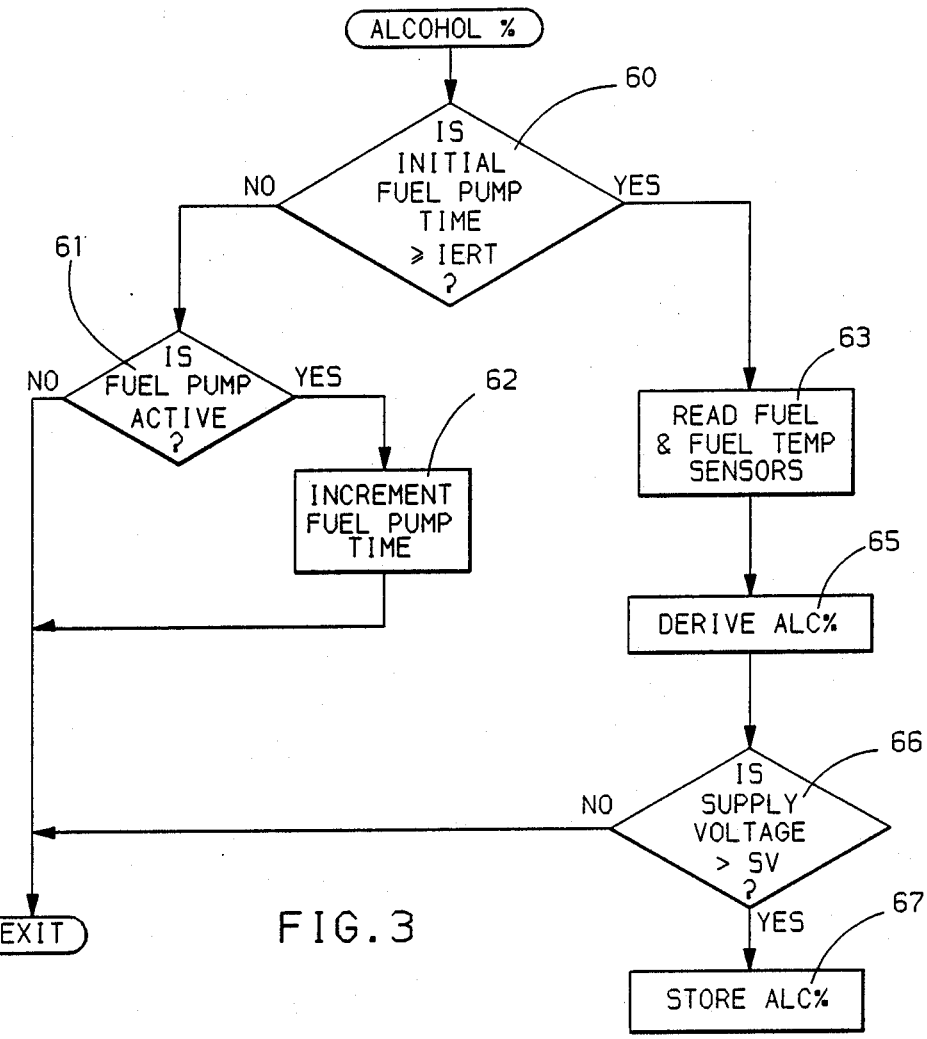
FIGS. 3-6 show flow charts which describe part of the operation of the controller of FIG. 2.

The output ALC from fuel composition sensor 16 is processed by the system to add to the accuracy and stability of fuel control. Once an initial engine run time IERT has expired after engine startup, the output of the fuel composition sensor 16 is read on a regular basis, such as in a 100 msec loop, along with the output of fuel temperature sensor 30, with the A/D converted values stored in RAM within controller 20. A flow chart of the routine is shown in FIG. 3. In an initial decision block 60, the fuel pump run time is compared to a reference initial engine run time IERT, which may be accomplished by comparing the contents of a memory byte used as a counter with another storing reference IERT. The fuel pump run time may be counted within control 20 from the initial generation of the FPRD signal which is output to activate fuel pump relay 45. The fuel pump run time is used as an indication of actual initial engine run time from the time engine cranking is begun. The reason for reference IERT and its calibration are discussed below. If the reference time IERT has not expired, another decision block 61 determines if the fuel pump is running. If not, as when the engine has not yet been started, the routine is exited. If so, however, the fuel pump run time memory location is incremented in step 62 before the routine is exited. If, at decision block 60, the fuel pump run time is found to be greater than or equal to reference IERT, the A/D converted fuel composition input signal ALC and fuel temperature signal FTS are read in step 63. The input signal ALC % is derived from ALC by conversion of ALC to a useful mathematical form, limiting its value within upper and lower boundaries and filtering the result in a first order low pass filter routine in step 65. Supply voltage BAT may be checked at decision point 66 against a reference to see if it is sufficient to provide a good ALC signal, with the derived value of ALC % stored only if BAT is sufficient.

During the initial engine run time equal to reference time IERT, however, the value of ALC % used by controller 20 is a value retained in a non-volatile memory location from the last period of engine operation. The stored value is used for several reasons. First, the gasoline and methanol constituents of the fuel may have separated in the fuel tank and lines, including sensor 16 itself, during a period in which the vehicle is not operating. Thus the last reading of the sensor before the last engine shutoff may provide a more accurate reading of ALC % than an initial reading of sensor 16 before the fuel is again mixed. Generally, several seconds should be allowed with sensor 16 in the position shown. In addition, the Vehicle supply voltage during operation of the cranking motor tends to fluctuate; and this may, in some arrangements, affect the accurate operation of sensor 16. This may last longer, especially in very cold weather when the engine is harder to start and the vehicle supply voltage drops farther.

An additional factor to be considered is the fact that the engine is usually stopped when the vehicle is refueled; and the refueling may significantly change the composition of fuel in tank 13. It is clearly desirable to sense this change in time to adjust the engine fuel control as the new fuel reaches the engine. However, a time period of 10–15 seconds elapses before the new fuel can be pumped from the tank to sensor 16 and be sensed. Thus there is no need to attempt to sense a major change in fuel for this period; and, during this time, the fuel system will see fuel having the old composition. Therefore, use of the stored value of ALC % for the time required by the new fuel to reach the sensor from tank 13 provides a good fuel composition signal during cranking; and the reference time IERT may be set equal to a value of substantially 10–15 seconds, which value may be constant, assuming a fuel pump which is regulated to a substantially constant pressure or flow. If fuel pump pressure or flow varies, the value of IERT as described in the preceding sentence should correspond to the fastest flow or be made variable in response to some flow indicating parameter such as applied voltage to the pump motor. Before the expiration of this time, fuel separation in the line and sensor will have ended and, in most cases, cranking will be finished. At the expiration of reference time IERT, sensor 16 is normally read so that the system is aware of any significant fuel change due to added fuel as soon as the new fuel reaches the sensor. However, if a particular vehicle apparatus is known to have difficulty with low vehicle supply voltage in accurate fuel composition sensing during cranking in cold weather, the supply voltage may still be monitored, as shown in FIG. 3, as a backup to the reference run time IERT to extend the period of no change in ALC % during such occasions until a good sensor reading is assured.

The desired air/fuel ratio A/F (or its inverse fuel/air ratio F/A) is not always updated in response to the value of ALC % for use in the calculations for fuel pulse duration. Although it is important to respond to any change in fuel due to a tank till and it is a good idea to continue sensing fuel composition during tansient conditions which might include fuel transitions, there are other modes of engine operation which are quite stable with regard to fuel control. Such modes generally involve closed loop fuel control, in which a fuel quantity is calculated but the calculation is modified on the basis of exhaust composition sensor 29, which provides an air/fuel ratio feedback signal. Due to practical cost limitations, the A/D conversion and computer apparatus has a limited resolution; and a very small change in fuel composition as sensed by sensor 16, which might even be due to an air bubble in the fuel line or electrical noise, may provide as much as a 0.7 air/fuel ratio change. To avoid forcing the integrators of the closed loop control to repeatedly recover from such small, meaningless changes and to thus promote stability of the fuel control in supposedly stable engine operating modes, the value of A/F (or F/A) is locked at the end of the preceding mode for use throughout the stable mode. It stays locked until the stable mode is ended or until a change in fuel composition as indicated by sensor 16 exceeds a predetermined amount, such as, for example, a seven percent change in ALC %. The preceding or first mode lasts sufficiently long that any new fuel composition in the fuel tank due to fuel fill has a chance to reach the fuel composition sensor. This procedure has been found to produce good results, since the fuel composition changes very little during such stable modes of operation. One such mode is described below.

The engine control of this embodiment, as with many known in the prior art, includes adaptive learning for fuel control in which a block of memory locations are used for correction factors that are updated in closed loop engine operation and included in the open loop portion of the fuel pulse width calculation. This is seen in the block learn multiplier BLM of the normal injection pulse duration equation shown above. In practice, the BLM factor is read from a lookup table on the basis of the value of engine speed and a load factor such as air flow when the injection pulse duration is calculated. A stored BLM factor may be changed, however, only when block learn is enabled; and this occurs only when specific engine operating conditions are met which are indicative of steady state engine operation. Typical specific conditions, all of which must exist for a calibrated time period, include closed loop operation on the oxygen sensor, coolant temperature within calibrated limits, A/F ratio equal to a calibrated value, an engine load factor at least equal to a calibrated value, and no indication of catalytic converter overtemperature. If these or similar equivalent conditions are met for the calibrated time, then the engine operating conditions are likely to produce stable engine operation; and the BLM multiplier for the present engine speed and load may be updated on the basis of the oxygen sensor output. This update may be accomplished, for example, by comparing the state of the closed loop integrator, as described in the aforementioned Jamrog patent, with the current oxygen sensor output, the BLM multiplier being incremented in the rich or lean direction as appropriate.

Figure 4:
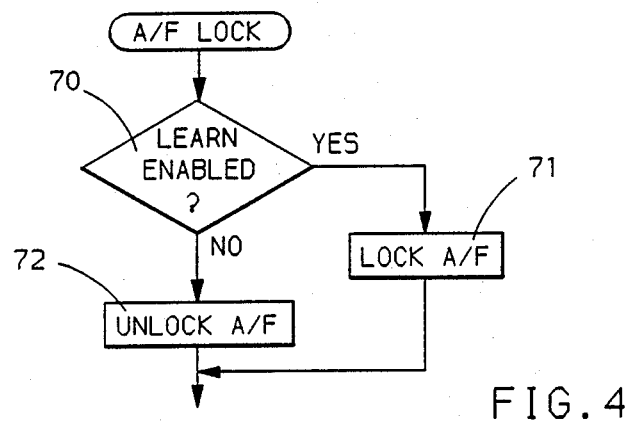

As described above, it is not desirable to have the closed loop control following a fuel control parameter derived from a fuel composition signal which may be changing for reason that are insignificant from the standpoint of fuel control Therefore, the value of desired A/F (F/A) ratio is locked against changes in ALC % while learn control is enabled. This represents a modification of the basic fuel injection pulse duration equation described above, in which the desired A/F ratio term depended on ALC %. The process is shown in the flow chart of FIG. 4, in which it is determined in decision block 70 if learn is enabled. If not, the desired A/F (F/A) ratio is unlocked at step 72 and the routine is exited; but, if so, a bit is set at step 71 to lock the value of the fuel control parameter A/F (F/A). Learn control is disabled and the value of A/F (F/A) unlocked if an oxygen sensor malfunction is detected, if engine 11 is shut off or if a fuel transition is detected.

Figure 5:
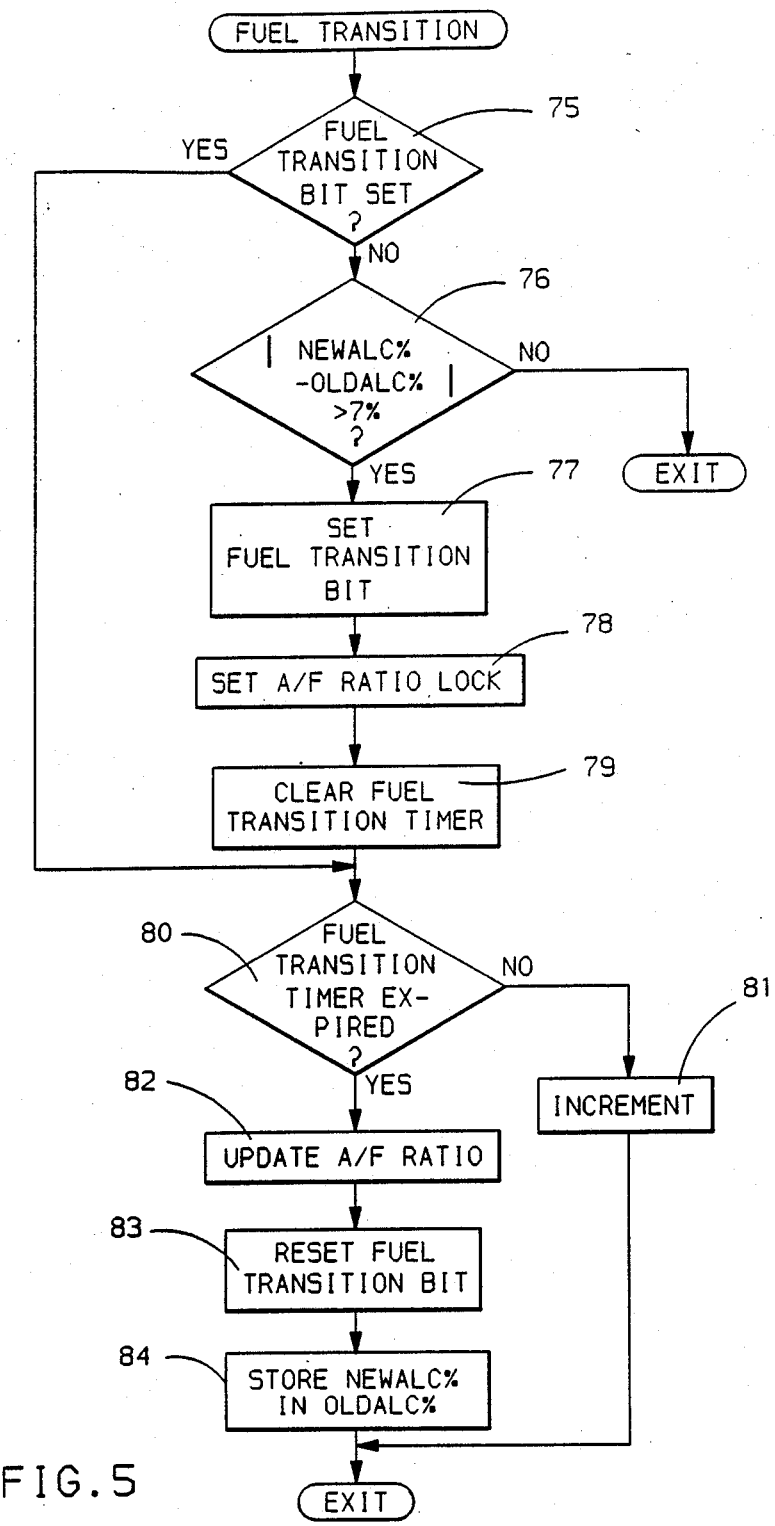

The value of ALC % may be temporarily locked with a fuel transition: that is, when a significant change in ALC % is detected. This might not be necessary if the sensor were incorporated directly into the fuel induction apparatus; however, there will ordinarily be some fuel travel time between fuel composition sensor 16 and the fuel induction apparatus. When the fuel composition changes slowly and gradually, travel time can be ignored; but when a sudden change occurs, it is desirable to maintain the old ALC % value for the time that the new fuel composition is in transit from sensor 16 to the fuel induction apparatus, during which the engine is still receiving the pre-change composition. The routine for accomplishing this is shown in the flow chart of FIG. 5, which describes the fuel transition logic.

The routine first checks a fuel transition bit at decision point 75. If it is not set, then fuel transition is not in progress, so the routine next checks for a new fuel transition, at decision point 76, by comparing the latest value of ALC % (NEWALC %) with a stored previous value of ALC % (OLDALC %). If the absolute value of the difference exceeds, for example, seven percent of OLDALC %, then a fuel transition is detected; and the fuel transition bit is set in step 77, the desired A/F ratio is locked at its most recent value in step 78, and a fuel transition timer byte in RAM is cleared in step 7.. If, at decision point 76, fuel transition was not detected, the routine is exited.

From step 79, or from decision point 75 if the fuel transition point had already been set, the routine proceeds to decision point 80, at which the fuel transition timer is checked for expiration of a predetermined fuel transition time corresponding to the time required for fuel to proceed from sensor 16 to the induction apparatus of engine 11. The timer is, in this embodiment, a memory byte in RAM which is incremented once each loop of the routine during fuel transition. If the fuel transition time has not expired, the timer byte is incremented in step 81 and the routine exited. If it has expired, however, the A/F ratio is updated in step 82 to a value based on the new value of ALC %, the fuel transition bit is reset in step 83, and OLDALC % is replaced in memory by NEWALC % before the routine is exited, Clearly, if the engine is operating with adaptive learning control activated and the value of A/F (F/A) thus locked, the detection of a fuel transition should result in an update of A/F (F/A) on the basis of the fuel composition signal or an end to adaptive learning contol or A/F lock. This may occur as soon as the fuel transition is detected.

Figure 6:
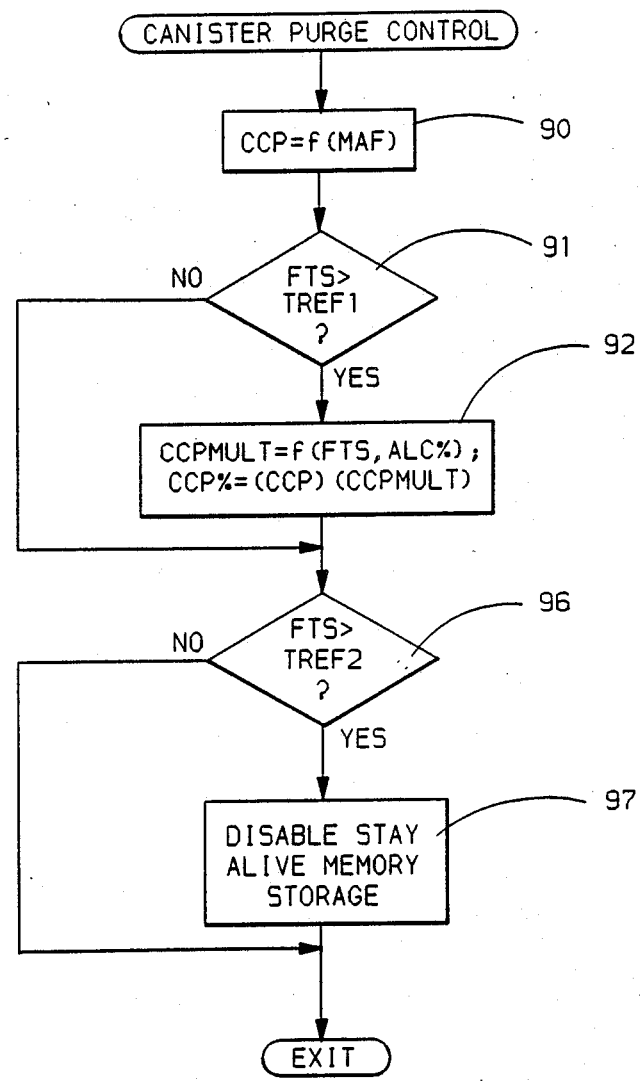

An important additional part of the fuel control for engine 11 is the canister purge control, modified from the standard production control as shown in FIG. 6. As already described, evaporated fuel from tank 13 is stored in a canister 17 for supply to engine 11 at controlled times in controlled quantities. Canister 17 is a normal canister of this type well known in the prior art which includes activated charcoal or a similar hydrocarbon absorbing or adsorbing substance. Normal quantities of evaporated fuel become trapped by the charcoal or similar substance until such time as the control for engine 11 provides a signal CCP to coil 37 of the canister control valve of canister 17. The signal is a pulse width modulated signal which causes the valve to reach an average open position based on the duty cycle of the signal. The valve throttles flow of fuel and/or air from the canister through conduit 19 to the induction apparatus of engine 11. The valve thus controls a canister purge flow of additional air/fuel mixture provided to engine 11. The air/fuel ratio of this mixture is not controlled, so the rate at which it is added to the overall mixture must be kept sufficiently small to be within the control of exhaust sensor 29. When canister purge is enabled, the CCP value for gasoline only is derived from a lookup table on the basis of measured engine air flow or a similar factor such as manifold absolute pressure or vacuum. Various canister purge algorithms are known in the prior art for gasoline fed engines.

Figure 7:
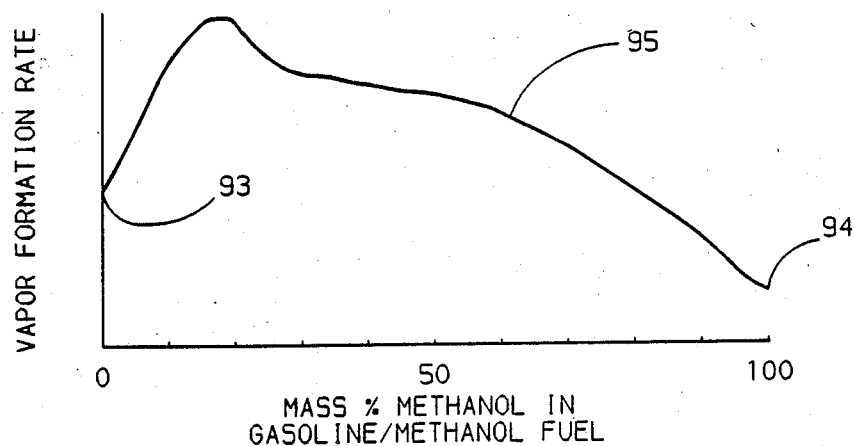
FIG. 7 is a graph of vapor formation rate in the fuel tank of a vehicle with fuel composition of a gasoline/methanol fuel mixture.

The use of an alternative fuel such as methanol can result in greater or less fuel evaporation, which varies both with fuel composition and with fuel temperature. Pure methanol is significantly less volatile than gasoline at the same temperature, but mixtures of methanol and gasoline can be more volatile in some proportions than either by itself. A typical plot of evaporation vs. fuel composition at a given fuel temperature is shown in FIG. 7. The volatility or evaporation rate increases from pure gasoline and from pure alcohol toward a maximum at a mixture somewhere between. Similar curves at higher or lower fuel temperatures show generally similar shapes but shift upward with fuel temperature. Since a multi-fuel engine must be designed to operate over a range of such mixtures, the canister control must be modified to handle different fuel evaporation rates. It should also be evident that some vehicles may have to be provided with a larger canister to handle the expected increased quantity of fuel vapor.

The standard canister purge control derives a CCP value as a function of, for example, mass air flow MAF in step 90 of FIG. 6. In order to adapt the canister purge algorithm for multi-fuel operation, the fuel temperature FTS is then compared at decision point 91 with a reference TREF1 such as 17 degrees C. If it exceeds this reference, a CCP multiplier CCPMULT is derived in step 92 from a lookup table based on fuel temperature FTS and fuel composition ALC %. Also at step 92, the output duty cycle CCP % =(CCP)(CCPMULT) is determined. The CCP multiplier CCPMULT may vary from 0 to 4, so that CCP values greater than or less than the normal gasoline only values are possible.

Referring to FIG. 7, curve 95 shows a typical variation of vapor formation rate in a predetermined fuel temperature range with fuel composition. Pure gasoline is shown as point 93 at the left end of the curve; and pure methanol is shown as point 94 at the extreme right end of the curve. It can be seen that the formation of vapor in the low range of methanol concentration is higher than that of either pure gasoline or pure methanol, reaching a maximum at about 20% methanol. The CCP multiplier will therefore increase similarly for mixtures of gasoline and methanol. Thus, the canister purge rate is optimized between the conflicting goals of removing fuel vapor from the canister as it evaporates from the fuel tank and altering the engine air/fuel ratio as little as possible. In addition, the vapor formation rate tends to increase with fuel temperature; and this may make itself felt especially in vehicles with fuel injection systems which recirculate unused fuel, with heat picked up from the engine compartment, back to the tank. Thus, the CCP multiplier may increase with increasing fuel temperature, at least through a predetermined fuel temperature range.

In some vehicle engines a non-volatile, stay alive memory may be employed to retain some of the values learned in adaptive learning control. If the rate of vapor formation is high, the closed loop fuel control may be skewed toward a lean mixture to compensate for the extra fuel vapor purged from the canister. If the engine is stopped and the vehicle allowed to sit overnight, for example, the fuel temperature at the next startup will be lower; and the learned values from the earlier period of higher fuel temperatures will be inappropriate. Thus, in decision point 96 of FIG. 6, the fuel temperature FTS is compared to a reference TREF2. If it is higher, the stay alive memory storage may be disabled at step 97 so that the inappropriate values will not be kept after engine operation is stopped.

An alternative to adjusting the fuel pulse duration for a different desired A/F ratio is a fuel pump pressure control responsive to ALC %. An electric motor driven fuel pump, which has been disclosed in the above-described system as being supplied with a regulated voltage for a constant speed and thus a constant output pressure, may be varied in speed by a controlled variable applied voltage. The pump pressure may be controllably varied through the motor armature voltage. The fuel pulse duration equations described above are calculated essentially in the normal manner for pure gasoline, except for the viscosity correction when this correction is not also incorporated in the fuel pulse pressure control; and the varying volumetric heat content of the variable fuel mixture is compensated by a variation in fuel pressure, which will vary the actual fuel delivered in a pulse of standard duration.

Figure 8:
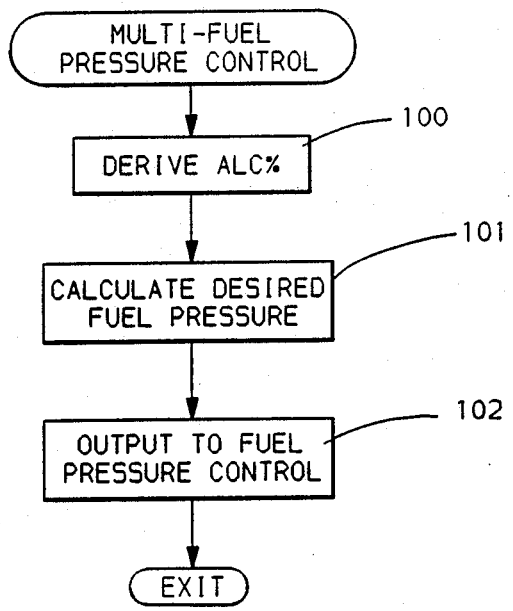
FIG. 8 shows a flow chart which describes a variation of the apparatus and operation described in the preceding drawings.

The method of fuel pump pressure control is shown in the flow chart of FIG. 8, in which the fuel composition ALC % is derived in step 101, as already described. Next, at step 101, the desired fuel pump pressure DPRES is derived from that for gasoline only GPRES according to the equation:

$$DPRES = (GPRES)[1 + (STK - 1)(ALC\%)/100]^2.$$

In this equation, STK is the stoichiometric ratio of gasoline to the alternate fuel. For methanol, it is 14.6/6.5 or approximately 2.25. Finally, in step 102, the desired pressure is output to a fuel pressure control circuit, which varies the supply voltage to the fuel pump accordingly to produce the desired pressure. Alternatively, the desired fuel pump pressure may be derived from a lookup table on the basis of ALC %.

If the fuel pump pressure method is used, all terms in the fuel pulse duration equations above are used as if for pure gasoline, with no need to expand the lookup tables for an extra dependence on fuel composition. The fuel viscosity factor may still used in the calculation, based on fuel composition and fuel temperature. However, if the fuel pump pressure is derived from a lookup table, the viscosity correction may also be incorporated into this lookup, which may then be also responsive to the sensed value of fuel temperature. The shift in oxygen sensor reference, the fuel transient and initial fuel pump run delays, and the canister purge modification as described above are a]1 used, although it may be desirable to vary the fuel transient and initial fuel pump run delays with fuel pump pressure to compensate for the variable flow rate through the system with fuel pressure. The A/F lock in adaptive learn control is not necessary, since the used value of desired A/F ratio does not vary with ALC %.

The embodiments of the invention in which an exclusive property or privilege is claimed are defined as follows:

1. A fuel control for a vehicle engine having a fuel tank with a liquid fuel mixture comprising first and second combustible fuels, a fuel conduit to the engine a fuel pump activated during engine operation to pump the fuel mixture from the fuel tank to the engine, a fuel composition sensor in the fuel conduit responsive to a physical parameter of the fuel mixture to generate a fuel composition signal indicative of the relative proportions of the first and second fuels in the fuel mixture, and means normally responsive to the fuel composition sensor during engine operation to repeatedly update a stored engine fuel control parameter in response to the fuel composition signal, the means normally responsive to the fuel composition signal being effective, in response to a predetermined change in the fuel composition signal, to delay updating of the stored engine fuel control parameter in response to the predetermined change for a fuel transition time duration substantially equal to the time required for the fuel pump to pump fuel from the fuel composition sensor to the engine.

2. The fuel control of claim 1 in which the fuel pump is operable to generate a variable fuel pressure and the fuel transition time duration is varied inversely with a parameter indicative of the fuel pressure.

* * * * *